United States Patent
Bolognese et al.

(10) Patent No.: US 12,478,359 B2
(45) Date of Patent: Nov. 25, 2025

(54) SURGICAL INSTRUMENTS AND MANUFACTURING METHODS FACILITATING DURABLE ENGAGEMENT BETWEEN COMPONENTS OF DIFFERENT MATERIALS

(71) Applicant: Covidien LP, Mansfield, MA (US)

(72) Inventors: Andrew P. Bolognese, West Newton, MA (US); Ryan M. McEvoy, Billerica, MA (US); Dale E. Whipple, Nashua, NH (US)

(73) Assignee: Covidien LP, Mansfield, MA (US)

( * ) Notice: Subject to any disclaimer, the term of this patent is extended or adjusted under 35 U.S.C. 154(b) by 594 days.

(21) Appl. No.: 17/943,769

(22) Filed: Sep. 13, 2022

(65) Prior Publication Data

US 2024/0081794 A1 Mar. 14, 2024

(51) Int. Cl.
*A61B 17/00* (2006.01)
(52) U.S. Cl.
CPC .... *A61B 17/00* (2013.01); *A61B 2017/00398* (2013.01); *A61B 2017/00477* (2013.01); *A61B 2017/00526* (2013.01)
(58) Field of Classification Search
CPC .......... A61B 17/00; A61B 2017/00398; A61B 2017/00477; A61B 2017/00526; A61B 17/32002
See application file for complete search history.

(56) References Cited

U.S. PATENT DOCUMENTS

| | | |
|---|---|---|
| 1,585,934 A | 5/1926 | Muir |
| 1,666,332 A | 4/1928 | Hirsch |
| 1,831,786 A | 11/1931 | Duncan |
| 2,708,437 A | 5/1955 | Hutchins |
| 3,297,022 A | 1/1967 | Wallace |
| 3,686,706 A | 8/1972 | Finley |
| 3,734,099 A | 5/1973 | Bender et al. |
| 3,791,379 A | 2/1974 | Storz |
| 3,812,855 A | 5/1974 | Banko |

(Continued)

FOREIGN PATENT DOCUMENTS

WO 2020185798 A1 9/2020

OTHER PUBLICATIONS

Extended European Search Report issued in corresponding European Application No. 23197043.5 dated Jan. 29, 2024, 10 pages.

*Primary Examiner* — Jonathan T Kuo
(74) *Attorney, Agent, or Firm* — Carter, DeLuca & Farrell LLP

(57) ABSTRACT

An assembly of a surgical instrument includes an outer component of a first material and having an interior surface, an inner component of a second, different material and having an exterior surface, and a bonding agent. The inner component is inserted at least partially into the outer component to define a volume between the interior surface of the outer component and the exterior surface of the inner component. The volume includes a plurality of longitudinal channels extending longitudinally along at least a portion of a length of the volume and a plurality of annular channels extending about at least a portion of a circumference of the volume. The bonding agent at least partially fills each longitudinal channel of the plurality of longitudinal channels and each annular channel of the plurality of annular channels to bond the first component with the second component.

20 Claims, 7 Drawing Sheets

(56) References Cited

U.S. PATENT DOCUMENTS

| | | |
|---|---|---|
| 3,835,842 A | 9/1974 | Iglesias |
| 3,850,162 A | 11/1974 | Iglesias |
| 3,945,375 A | 3/1976 | Banko |
| 3,980,252 A | 9/1976 | Tae |
| 3,995,619 A | 12/1976 | Glatzer |
| 3,996,921 A | 12/1976 | Neuwirth |
| 4,011,869 A | 3/1977 | Seiler, Jr. |
| 4,108,182 A | 8/1978 | Hartman et al. |
| 4,146,405 A | 3/1979 | Timmer et al. |
| 4,198,958 A | 4/1980 | Utsugi |
| 4,203,444 A | 5/1980 | Bonnell et al. |
| 4,210,146 A | 7/1980 | Banko |
| 4,246,902 A | 1/1981 | Martinez |
| 4,247,180 A | 1/1981 | Norris |
| 4,258,721 A | 3/1981 | Parent et al. |
| 4,261,346 A | 4/1981 | Wettermann |
| 4,294,234 A | 10/1981 | Matsuo |
| 4,316,465 A | 2/1982 | Dotson, Jr. |
| 4,369,768 A | 1/1983 | Vukovic |
| 4,392,485 A | 7/1983 | Hiltebrandt |
| 4,414,962 A | 11/1983 | Carson |
| 4,449,538 A | 5/1984 | Corbitt et al. |
| 4,493,698 A | 1/1985 | Wang et al. |
| 4,517,977 A | 5/1985 | Frost |
| 4,543,965 A | 10/1985 | Pack et al. |
| 4,567,880 A | 2/1986 | Goodman |
| 4,589,414 A | 5/1986 | Yoshida et al. |
| 4,601,284 A | 7/1986 | Arakawa et al. |
| 4,601,290 A | 7/1986 | Effron et al. |
| 4,606,330 A | 8/1986 | Bonnet |
| 4,630,598 A | 12/1986 | Bonnet |
| 4,644,952 A | 2/1987 | Patipa et al. |
| 4,649,919 A | 3/1987 | Thimsen et al. |
| 4,700,694 A | 10/1987 | Shishido |
| 4,706,656 A | 11/1987 | Kuboto |
| 4,718,291 A | 1/1988 | Wood et al. |
| 4,737,142 A | 4/1988 | Heckele |
| 4,749,376 A | 6/1988 | Kensey et al. |
| 4,756,309 A | 7/1988 | Sachse et al. |
| 4,819,635 A | 4/1989 | Shapiro |
| 4,844,064 A | 7/1989 | Thimsen et al. |
| 4,850,354 A | 7/1989 | McGurk-Burleson et al. |
| 4,856,919 A | 8/1989 | Takeuchi et al. |
| 4,867,157 A | 9/1989 | McGurk-Burleson et al. |
| 4,924,851 A | 5/1990 | Ognier et al. |
| 4,940,061 A | 7/1990 | Terwilliger et al. |
| 4,950,278 A | 8/1990 | Sachse et al. |
| 4,955,882 A | 9/1990 | Hakky |
| 4,986,827 A | 1/1991 | Akkas et al. |
| 4,998,527 A | 3/1991 | Meyer |
| 4,998,914 A | 3/1991 | Wiest et al. |
| 5,007,917 A | 4/1991 | Evans |
| 5,027,792 A | 7/1991 | Meyer |
| 5,037,386 A | 8/1991 | Marcus et al. |
| 5,105,800 A | 4/1992 | Takahashi et al. |
| 5,106,364 A | 4/1992 | Hayafuji et al. |
| 5,112,299 A | 5/1992 | Pascaloff |
| 5,116,868 A | 5/1992 | Chen et al. |
| 5,125,910 A | 6/1992 | Freitas |
| 5,133,713 A | 7/1992 | Huang et al. |
| 5,152,744 A | 10/1992 | Krause et al. |
| 5,158,553 A | 10/1992 | Berry et al. |
| 5,163,433 A | 11/1992 | Kagawa et al. |
| 5,169,397 A | 12/1992 | Sakashita et al. |
| 5,176,677 A | 1/1993 | Wuchinich |
| 5,195,541 A | 3/1993 | Obenchain |
| 5,226,910 A | 7/1993 | Kajiyama et al. |
| 5,244,459 A | 9/1993 | Hill |
| 5,254,117 A | 10/1993 | Rigby et al. |
| 5,269,785 A | 12/1993 | Bonutti |
| 5,270,622 A | 12/1993 | Krause |
| 5,275,609 A | 1/1994 | Pingleton et al. |
| 5,288,290 A | 2/1994 | Brody |
| 5,304,118 A | 4/1994 | Trese et al. |
| 5,312,399 A | 5/1994 | Hakky et al. |
| 5,312,425 A | 5/1994 | Evans et al. |
| 5,312,430 A | 5/1994 | Rosenbluth et al. |
| 5,320,091 A | 6/1994 | Grossi et al. |
| 5,347,992 A | 9/1994 | Pearlman et al. |
| 5,350,390 A | 9/1994 | Sher |
| 5,364,395 A | 11/1994 | West, Jr. |
| 5,374,253 A | 12/1994 | Burns, Sr. et al. |
| 5,390,585 A | 2/1995 | Ryuh |
| 5,392,765 A | 2/1995 | Muller |
| 5,395,313 A | 3/1995 | Naves et al. |
| 5,403,276 A | 4/1995 | Schechter et al. |
| 5,409,013 A | 4/1995 | Clement |
| 5,409,453 A | 4/1995 | Lundquist et al. |
| 5,411,513 A | 5/1995 | Ireland et al. |
| 5,421,819 A | 6/1995 | Edwards et al. |
| 5,425,376 A | 6/1995 | Banys et al. |
| 5,429,601 A | 7/1995 | Conley et al. |
| 5,435,805 A | 7/1995 | Edwards et al. |
| 5,443,476 A | 8/1995 | Shapiro |
| 5,449,356 A | 9/1995 | Walbrink et al. |
| 5,456,673 A | 10/1995 | Ziegler et al. |
| 5,456,689 A | 10/1995 | Kresch et al. |
| 5,483,951 A | 1/1996 | Frassica et al. |
| 5,490,819 A | 2/1996 | Nicholas et al. |
| 5,490,860 A | 2/1996 | Middle et al. |
| 5,492,537 A | 2/1996 | Vancaillie |
| 5,498,258 A | 3/1996 | Hakky et al. |
| 5,527,331 A | 6/1996 | Kresch et al. |
| 5,549,541 A | 8/1996 | Muller |
| 5,556,378 A | 9/1996 | Storz et al. |
| 5,563,481 A | 10/1996 | Krause |
| 5,569,164 A | 10/1996 | Lurz |
| 5,569,254 A | 10/1996 | Carlson et al. |
| 5,569,284 A | 10/1996 | Young et al. |
| 5,575,756 A | 11/1996 | Karasawa et al. |
| 5,591,187 A | 1/1997 | Dekel |
| 5,601,583 A | 2/1997 | Donahue et al. |
| 5,601,603 A | 2/1997 | Illi |
| 5,602,449 A | 2/1997 | Krause et al. |
| 5,603,332 A | 2/1997 | O'Connor |
| 5,630,798 A | 5/1997 | Beiser et al. |
| 5,649,547 A | 7/1997 | Ritchart et al. |
| 5,669,927 A | 9/1997 | Boebel et al. |
| 5,672,945 A | 9/1997 | Krause |
| 5,674,179 A | 10/1997 | Bonnet et al. |
| 5,676,497 A | 10/1997 | Kim |
| 5,695,448 A | 12/1997 | Kimura et al. |
| 5,702,420 A | 12/1997 | Sterling et al. |
| 5,709,698 A | 1/1998 | Adams et al. |
| 5,730,752 A | 3/1998 | Alden et al. |
| 5,733,298 A | 3/1998 | Berman et al. |
| 5,741,286 A | 4/1998 | Recuset |
| 5,741,287 A | 4/1998 | Alden et al. |
| 5,749,885 A | 5/1998 | Sjostrom et al. |
| 5,749,889 A | 5/1998 | Bacich et al. |
| 5,759,185 A | 6/1998 | Grinberg |
| 5,772,634 A | 6/1998 | Atkinson |
| 5,775,333 A | 7/1998 | Burbank et al. |
| 5,782,849 A | 7/1998 | Miller |
| 5,807,240 A | 9/1998 | Muller et al. |
| 5,807,282 A | 9/1998 | Fowler |
| 5,810,770 A | 9/1998 | Chin et al. |
| 5,810,861 A | 9/1998 | Gaber |
| 5,814,009 A | 9/1998 | Wheatman |
| 5,833,643 A | 11/1998 | Ross et al. |
| 5,840,060 A | 11/1998 | Beiser et al. |
| 5,857,995 A | 1/1999 | Thomas et al. |
| 5,873,886 A | 2/1999 | Larsen et al. |
| 5,899,915 A | 5/1999 | Saadat |
| 5,911,699 A | 6/1999 | Anis et al. |
| 5,911,722 A | 6/1999 | Adler et al. |
| 5,913,867 A | 6/1999 | Dior |
| 5,916,229 A | 6/1999 | Evans |
| 5,925,055 A | 7/1999 | Adrian et al. |
| 5,928,163 A | 7/1999 | Roberts et al. |
| 5,944,668 A | 8/1999 | Vancaillie et al. |
| 5,947,990 A | 9/1999 | Smith |
| 5,951,490 A | 9/1999 | Fowler |
| 5,956,130 A | 9/1999 | Vancaillie et al. |

(56) References Cited

U.S. PATENT DOCUMENTS

| | | |
|---|---|---|
| 5,957,832 A | 9/1999 | Taylor et al. |
| 6,001,116 A | 12/1999 | Heisler et al. |
| 6,004,320 A | 12/1999 | Casscells et al. |
| 6,007,513 A | 12/1999 | Anis et al. |
| 6,024,751 A | 2/2000 | Lovato et al. |
| 6,032,673 A | 3/2000 | Savage et al. |
| 6,039,748 A | 3/2000 | Savage et al. |
| 6,042,552 A | 3/2000 | Cornier |
| 6,068,641 A | 5/2000 | Varsseveld |
| 6,086,542 A | 7/2000 | Glowa et al. |
| 6,090,094 A | 7/2000 | Clifford, Jr. et al. |
| 6,090,123 A | 7/2000 | Culp et al. |
| 6,113,594 A | 9/2000 | Savage |
| 6,119,973 A | 9/2000 | Galloway |
| 6,120,147 A | 9/2000 | Vijfvinkel et al. |
| 6,120,462 A | 9/2000 | Hibner et al. |
| 6,132,448 A | 10/2000 | Perez et al. |
| 6,149,633 A | 11/2000 | Maaskamp |
| 6,156,049 A | 12/2000 | Lovato et al. |
| 6,159,160 A | 12/2000 | Hsei et al. |
| 6,159,209 A | 12/2000 | Hakky |
| 6,171,316 B1 | 1/2001 | Kovac et al. |
| 6,203,518 B1 | 3/2001 | Anis et al. |
| 6,217,543 B1 | 4/2001 | Anis et al. |
| 6,224,603 B1 | 5/2001 | Marino |
| 6,244,228 B1 | 6/2001 | Kuhn et al. |
| 6,258,111 B1 | 7/2001 | Ross et al. |
| 6,277,096 B1 | 8/2001 | Cortella et al. |
| 6,293,957 B1 | 9/2001 | Peters et al. |
| 6,315,714 B1 | 11/2001 | Akiba |
| 6,358,200 B1 | 3/2002 | Grossi |
| 6,358,263 B2 | 3/2002 | Mark et al. |
| 6,359,200 B1 | 3/2002 | Day |
| 6,402,701 B1 | 6/2002 | Kaplan et al. |
| 6,428,486 B2 | 8/2002 | Ritchart et al. |
| 6,471,639 B2 | 10/2002 | Rudischhauser et al. |
| 6,494,892 B1 | 12/2002 | Ireland et al. |
| 6,585,708 B1 | 7/2003 | Maaskamp |
| 6,610,066 B2 | 8/2003 | Dinger et al. |
| 6,626,827 B1 | 9/2003 | Felix et al. |
| 6,632,182 B1 | 10/2003 | Treat |
| 6,656,132 B1 | 12/2003 | Ouchi |
| 6,663,641 B1 | 12/2003 | Kovac et al. |
| 6,712,773 B1 | 3/2004 | Viola |
| 6,824,544 B2 | 11/2004 | Boebel et al. |
| 6,837,847 B2 | 1/2005 | Ewers et al. |
| 7,025,720 B2 | 4/2006 | Boebel et al. |
| 7,025,732 B2 | 4/2006 | Thompson et al. |
| 7,150,713 B2 | 12/2006 | Shener et al. |
| 7,226,459 B2 | 6/2007 | Cesarini et al. |
| 7,249,602 B1 | 7/2007 | Emanuel |
| 7,510,563 B2 | 3/2009 | Cesarini et al. |
| 7,763,033 B2 | 7/2010 | Gruber et al. |
| 7,922,737 B1 | 4/2011 | Cesarini et al. |
| 8,062,214 B2 | 11/2011 | Shener et al. |
| 8,419,626 B2 | 4/2013 | Shener-Irmakoglu et al. |
| 8,574,253 B2 | 11/2013 | Gruber et al. |
| 8,663,264 B2 | 3/2014 | Cesarini et al. |
| 8,678,999 B2 | 3/2014 | Isaacson |
| 8,840,626 B2 | 9/2014 | Adams et al. |
| 8,852,085 B2 | 10/2014 | Shener-Irmakoglu et al. |
| 8,893,722 B2 | 11/2014 | Emanuel |
| 8,932,208 B2 | 1/2015 | Kendale et al. |
| 8,951,274 B2 | 2/2015 | Adams et al. |
| 9,060,800 B1 | 6/2015 | Cesarini et al. |
| 9,060,801 B1 | 6/2015 | Cesarini et al. |
| 9,066,745 B2 | 6/2015 | Cesarini et al. |
| 9,072,431 B2 | 7/2015 | Adams et al. |
| 9,089,358 B2 | 7/2015 | Emanuel |
| 9,125,550 B2 | 9/2015 | Shener-Irmakoglu et al. |
| 9,155,454 B2 | 10/2015 | Sahney et al. |
| 2001/0039963 A1 | 11/2001 | Spear et al. |
| 2001/0047183 A1 | 11/2001 | Privitera et al. |
| 2002/0058859 A1 | 5/2002 | Brommersma |
| 2002/0165427 A1 | 11/2002 | Yachia et al. |
| 2003/0050603 A1 | 3/2003 | Todd |
| 2003/0050638 A1 | 3/2003 | Yachia et al. |
| 2003/0078609 A1 | 4/2003 | Finlay et al. |
| 2003/0114875 A1 | 6/2003 | Sjostrom |
| 2004/0010258 A1 | 1/2004 | Carusillo et al. |
| 2004/0204671 A1 | 10/2004 | Stubbs et al. |
| 2004/0220602 A1 | 11/2004 | Deng et al. |
| 2005/0043690 A1 | 2/2005 | Todd |
| 2005/0085692 A1 | 4/2005 | Kiehn et al. |
| 2005/0240206 A1 | 10/2005 | Sjostrom |
| 2006/0036132 A1 | 2/2006 | Renner et al. |
| 2006/0047185 A1 | 3/2006 | Shener et al. |
| 2006/0161191 A1 | 7/2006 | Bucina |
| 2006/0241586 A1 | 10/2006 | Wilk |
| 2007/0016226 A1* | 1/2007 | Campbell ............... A61B 90/98 606/116 |
| 2008/0015621 A1 | 1/2008 | Emanuel |
| 2008/0058588 A1 | 3/2008 | Emanuel |
| 2008/0058842 A1 | 3/2008 | Emanuel |
| 2008/0097468 A1 | 4/2008 | Adams et al. |
| 2008/0097469 A1 | 4/2008 | Gruber et al. |
| 2008/0097470 A1 | 4/2008 | Gruber et al. |
| 2008/0097471 A1 | 4/2008 | Adams et al. |
| 2008/0135053 A1 | 6/2008 | Gruber et al. |
| 2008/0146872 A1 | 6/2008 | Gruber et al. |
| 2008/0146873 A1 | 6/2008 | Adams et al. |
| 2008/0245371 A1 | 10/2008 | Gruber |
| 2008/0249366 A1 | 10/2008 | Gruber et al. |
| 2008/0249534 A1 | 10/2008 | Gruber et al. |
| 2008/0249553 A1 | 10/2008 | Gruber et al. |
| 2008/0262308 A1 | 10/2008 | Prestezog et al. |
| 2009/0082628 A1 | 3/2009 | Kucklick et al. |
| 2009/0192347 A1* | 7/2009 | Davila .................. A61F 2/0022 600/37 |
| 2009/0270812 A1 | 10/2009 | Litscher et al. |
| 2009/0270895 A1 | 10/2009 | Churchill et al. |
| 2009/0270896 A1 | 10/2009 | Sullivan et al. |
| 2009/0270897 A1 | 10/2009 | Adams et al. |
| 2009/0270898 A1 | 10/2009 | Chin et al. |
| 2010/0087798 A1 | 4/2010 | Adams et al. |
| 2010/0125287 A1 | 5/2010 | Cole et al. |
| 2010/0152647 A1 | 6/2010 | Shener et al. |
| 2011/0166419 A1 | 7/2011 | Reif et al. |
| 2012/0078038 A1 | 3/2012 | Sahney et al. |
| 2012/0209289 A1 | 8/2012 | Duque et al. |
| 2012/0253227 A1 | 10/2012 | Shener-Irmakoglu et al. |
| 2013/0131452 A1 | 5/2013 | Kuroda et al. |
| 2014/0031834 A1 | 1/2014 | Germain et al. |
| 2014/0222003 A1 | 8/2014 | Herndon et al. |
| 2017/0020545 A1 | 1/2017 | Loreth |
| 2018/0318133 A1 | 11/2018 | Clauson et al. |
| 2018/0368848 A1 | 12/2018 | Shelton, IV et al. |
| 2020/0289190 A1* | 9/2020 | Bourgeault ............ A61B 17/29 |
| 2021/0104938 A1 | 4/2021 | Magno |
| 2022/0146028 A1* | 5/2022 | Feith ...................... F16L 33/34 |
| 2022/0233812 A1 | 7/2022 | Farrell et al. |
| 2022/0273475 A1 | 9/2022 | Tassoni et al. |

* cited by examiner

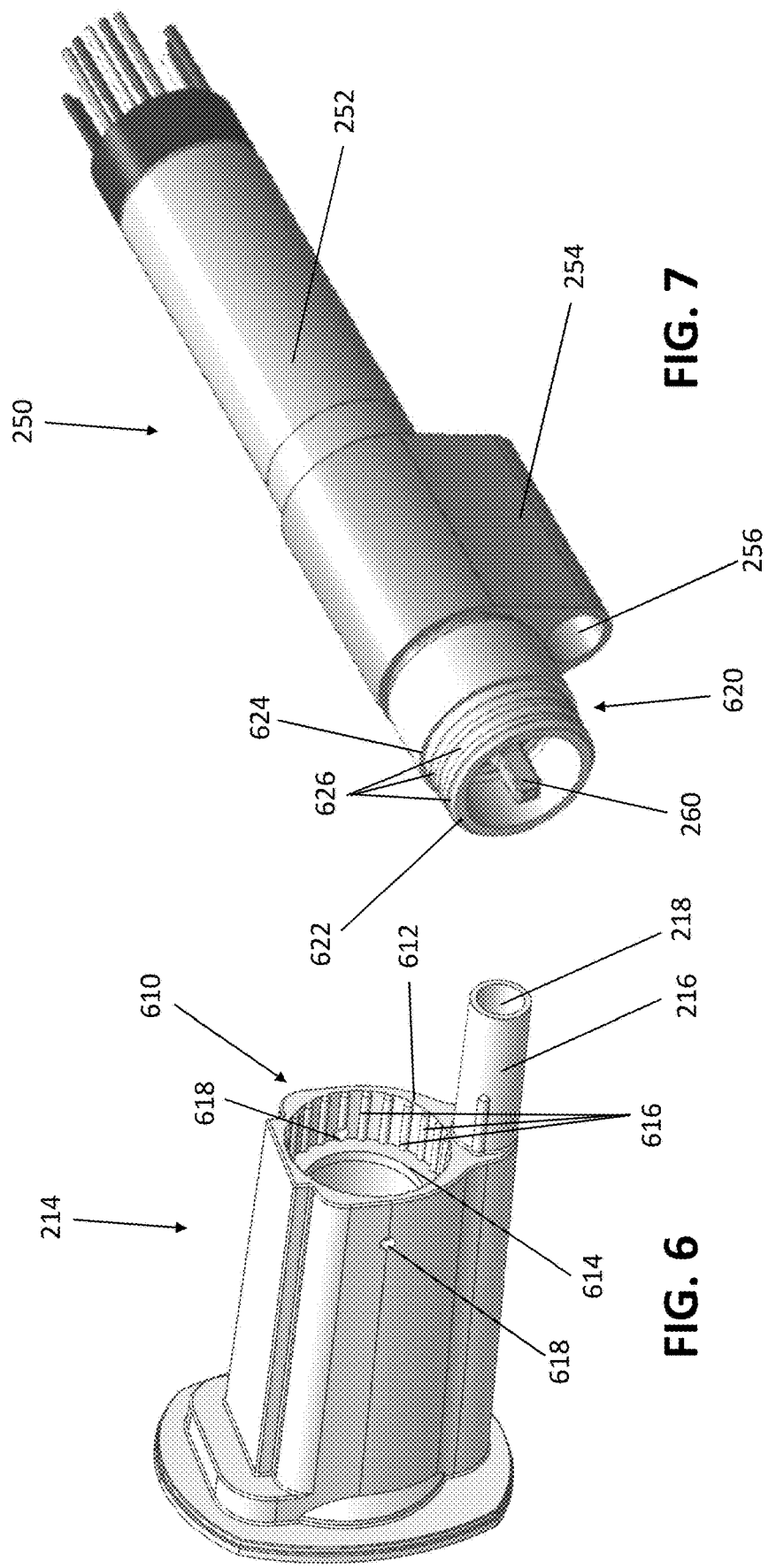

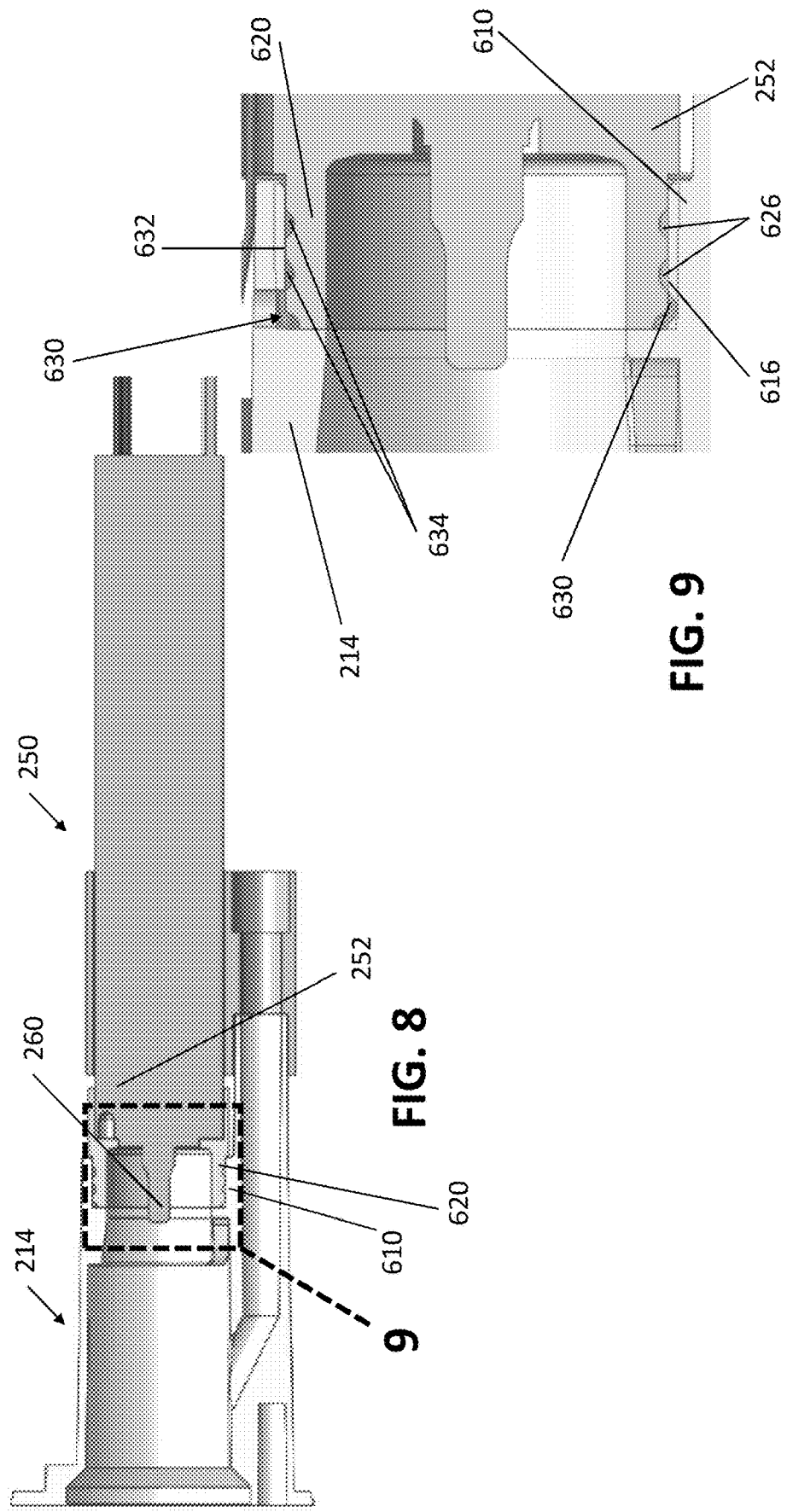

SURGICAL INSTRUMENTS AND MANUFACTURING METHODS FACILITATING DURABLE ENGAGEMENT BETWEEN COMPONENTS OF DIFFERENT MATERIALS

FIELD

The present disclosure relates generally to surgical instruments. In particular, the present disclosure relates to surgical instruments and manufacturing methods facilitating durable engagement between components of different materials.

BACKGROUND

Many surgical instruments include components of different materials that are joined to one another such as, for example, via bonding, mechanical engagement, overmolding, etc. More specifically, surgical instruments commonly include metal components and plastic components joined to one another via the use of bonding agents, e.g., epoxies, adhesives, glues, etc. Different materials, e.g., metals versus plastics, have different rates of thermal expansion, different moduli of elasticity, different responses to stress, different wear profiles, etc. Thus, repeated use, cleaning, assembly/disassembly, thermal cycling, etc. may result in the development of cracks, gaps between components, and/or other failures, thereby reducing the useful life of such surgical instruments.

SUMMARY

As used herein, the term "distal" refers to the portion that is described which is farther from a user (whether a human clinician or a robotic operator), while the term "proximal" refers to the portion that is described which is closer to a user. Further, to the extent consistent, any or all of the aspects described herein may be used in conjunction with any or all of the other aspects described herein.

Provided in accordance with aspects of the present disclosure is an assembly of a surgical instrument including an outer component of a first material, an inner component of a second material different from the first material, and a bonding agent. The outer component has an interior surface and the inner component has an exterior surface. The inner component is inserted at least partially into the outer component to define a volume between the interior surface of the outer component and the exterior surface of the inner component. The volume includes a plurality of longitudinal channels and a plurality of annular channels. The plurality of longitudinal channels extends longitudinally along at least a portion of a length of the volume and the plurality of annular channels extends about at least a portion of a circumference of the volume. The bonding agent at least partially fills each longitudinal channel of the plurality of longitudinal channels and each annular channel of the plurality of annular channels to bond the first component with the second component.

In an aspect of the present disclosure, the outer component includes an outer cylinder defining the interior surface and the inner component includes an inner cylinder defining the exterior surface.

In another aspect of the present disclosure, one of the first material or the second material is a plastic and another of the first material or the second material is a metal.

In another aspect of the present disclosure, the bonding agent is a two-part epoxy.

In still another aspect of the present disclosure, the outer component further includes at least one aperture in communication with the volume and configured to permit introduction of the bonding agent into the volume.

In yet another aspect of the present disclosure, the inner component is inserted at least partially into the outer component in a press-fit engagement.

In still yet another aspect of the present disclosure, one of the outer component or the inner component includes a plurality of ribs. The plurality of ribs at least partially defines the plurality of longitudinal channels. Alternatively or additionally, one of the outer component or the inner component defines a plurality of grooves. The plurality of grooves at least partially defines the plurality of annular channels.

In another aspect of the present disclosure, the plurality of longitudinal channels extends longitudinally along an entirety of the length of the volume. Alternatively or additionally, the plurality of annular channels extends about an entirety of the circumference of the volume.

An assembly of a motor-driven surgical handpiece assembly provided in accordance with aspects of the present disclosure includes a core body made of a plastic and including an interior surface, a motor housing made of a metal and having an exterior surface, and a bonding agent. The motor housing is inserted at least partially into the core body to define a volume between the interior surface of the core body and the exterior surface of the motor housing. The volume includes a plurality of spaced-apart longitudinal channels and a plurality of spaced-apart annular channels. The bonding agent at least partially fills each longitudinal channel of the plurality of spaced-apart longitudinal channels and each annular channel of the plurality of spaced-apart annular channels to bond the core body with the motor housing.

In an aspect of the present disclosure, the core body includes an outer cylinder defining the interior surface and the motor housing includes an inner cylinder defining the exterior surface.

In another aspect of the present disclosure, the bonding agent is a two-part epoxy.

In still another aspect of the present disclosure, the core body includes at least one aperture in communication with the volume and configured to permit introduction of the bonding agent into the volume.

In yet another aspect of the present disclosure, the motor housing is inserted at least partially into the core body in a press-fit engagement.

In still yet another aspect of the present disclosure, the core body includes a plurality of ribs disposed on the interior surface. The plurality of ribs at least partially defines the plurality of longitudinal channels. Alternatively or additionally, the motor housing includes a plurality of grooves defined within the exterior surface. The plurality of grooves at least partially defines the plurality of annular channels.

A method of manufacturing an assembly of a surgical instrument provided in accordance with aspects of the present disclosure includes inserting a second component into a first component such that a volume is defined between an interior surface of the first component and an exterior surface of the second component. The volume includes a plurality of spaced-apart longitudinal channels and a plurality of spaced-apart annular channels. The method further includes introducing a bonding agent into the volume to at least partially fill each longitudinal channel of the plurality of spaced-apart longitudinal channels and each annular channel of the plurality of spaced-apart annular channels to bond the first component with the second component.

In an aspect of the present disclosure, introducing the bonding agent includes introducing the bonding agent through at least one aperture defined within the first component.

In another aspect of the present disclosure, inserting the second component into the first component includes press-fit engaging the second component with the first component.

BRIEF DESCRIPTION OF THE DRAWINGS

Various aspects and features of the present disclosure are described hereinbelow with reference to the drawings wherein like numerals designate identical or corresponding elements in each of the several views.

FIGS. 6 and 7 are perspective views of the core body and the motor housing of the motor, respectively of the handpiece assembly of FIG. 1;

FIG. 8 is a longitudinal, cross-sectional view of the core body and the motor housing of the motor of the handpiece assembly of FIG. 1 engaged with one another; and FIG. 9 is an enlarged, longitudinal, cross-sectional view of the area of detail indicated as "9" in FIG. 8.

DETAILED DESCRIPTION

The present disclosure relates to surgical instruments and manufacturing methods facilitating durable engagement between components of different materials. Although detailed herein with respect to a tissue resecting instrument 10, the aspects and features of the present disclosure are equally applicable for use with any other suitable surgical instrument or portion thereof.

Figure 1:
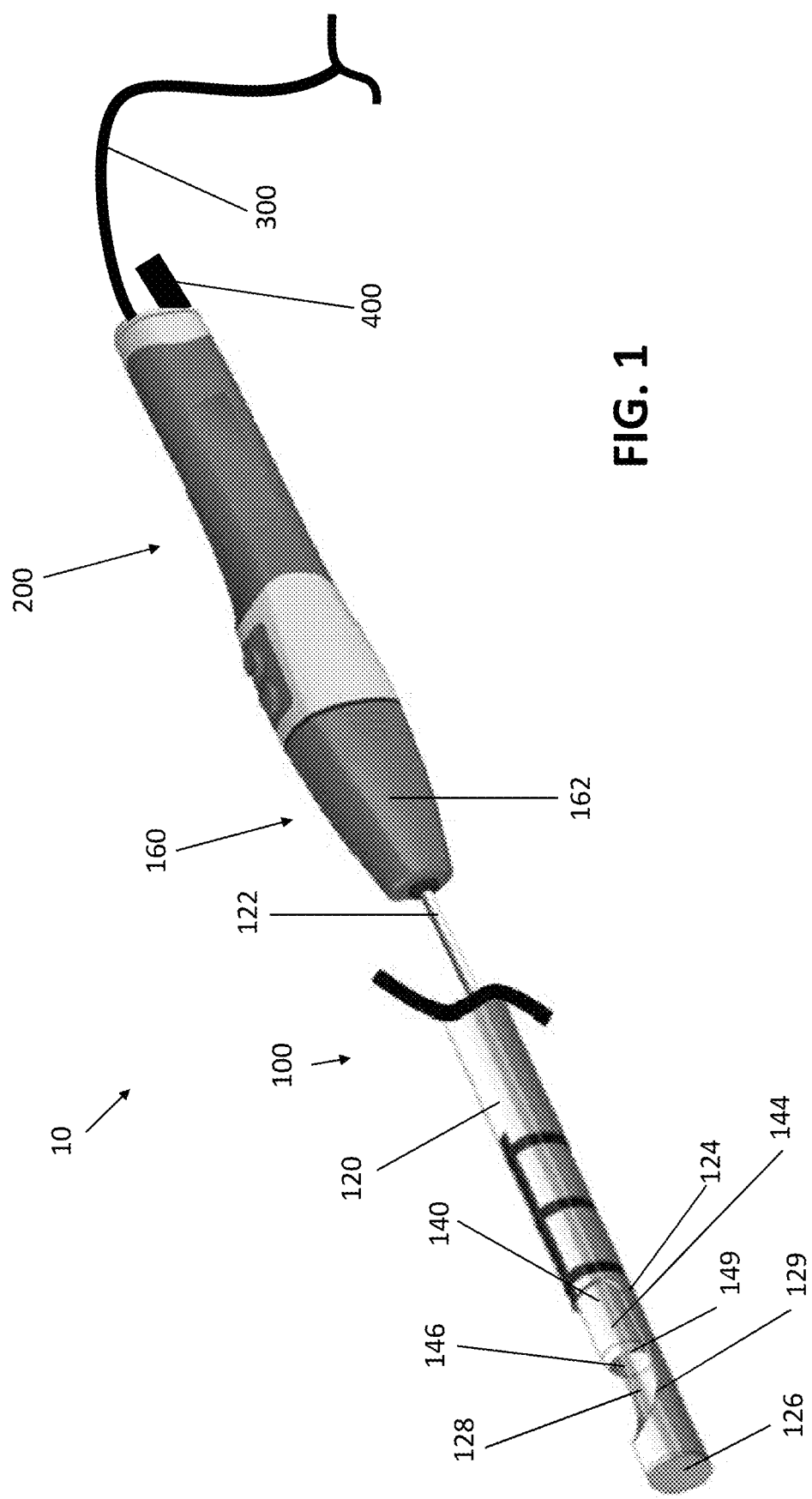
FIG. 1 is a perspective view of a surgical instrument provided in accordance with aspects of the present disclosure including an end effector assembly releasably engaged with a handpiece assembly.

Referring to FIG. 1, a tissue resecting instrument 10 provided in accordance with the present disclosure and configured to resect tissue includes an end effector assembly 100 and a handpiece assembly 200. Tissue resecting instrument 10 is adapted to connect to a control unit (not shown) via a cable 300 to provide power and control functionality to tissue resecting instrument 10, although tissue resecting instrument 10 may alternatively or additionally include a power source, e.g., battery, and/or a control unit disposed within handpiece assembly 200. Tissue resecting instrument 10 is further adapted to connect to a fluid management system (not shown) via outflow tubing (not shown) connected to outflow port 400 for applying suction to remove fluid, tissue, and debris from a surgical site via tissue resecting instrument 10. The control unit and fluid management system may be integral with one another, coupled to one another, or separate from one another.

Tissue resecting instrument 10 may be configured as a single-use device that is discarded after use or sent to a manufacturer for reprocessing, a reusable device capable of being cleaned and/or sterilized for repeated use by the end-user, or a partially-single-use, partially-reusable device. With respect to partially-single-use, partially-reusable configurations, handpiece assembly 200 may be configured as a cleanable/sterilizable, reusable component, while end effector assembly 100 is configured as a single-use, disposable/reprocessable component. In any of the above configurations, end effector assembly 100 is configured to releasably engage handpiece assembly 200 to facilitate disposal/reprocessing of any single-use components and cleaning and/or sterilization of any reusable components. Further, enabling releasable engagement of end effector assembly 100 with handpiece assembly 200 allows for interchangeable use of different end effector assemblies, e.g., different length, configuration, etc., end effector assemblies, with handpiece assembly 200.

Figure 2:
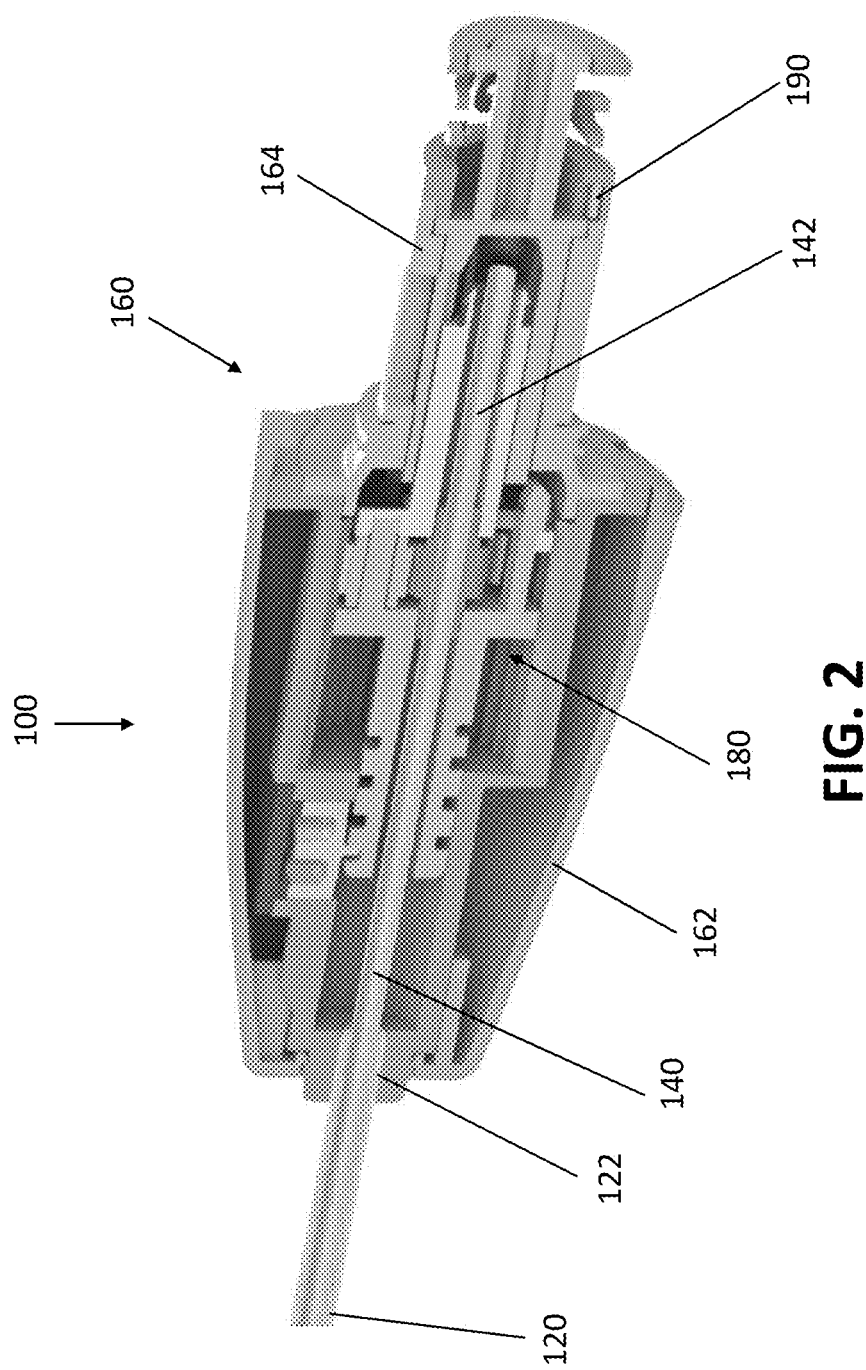
FIG. 2 is longitudinal, cross-sectional view of a portion of the end effector assembly of FIG. 1.

With additional reference to FIG. 2, end effector assembly 100 includes an outer shaft 120, an inner shaft 140, a hub assembly 160, a drive assembly 180, and an RFID chip 190. Outer shaft 120 includes a proximal end portion 122 and a distal end portion 124 defining an at least partially closed distal end 126 and a transverse window 128 disposed adjacent the at least partially closed distal end 126. Window 128 provides access to the interior of outer shaft 120 transversely through a sidewall thereof and may be surrounded by a cutting edge 129 about the outer perimeter of window 128 so as to facilitate cutting of tissue passing through window 128 and into outer shaft 120.

Inner shaft 140 includes a proximal end portion 142 and a distal end portion 144 defining an open distal end 146. A cutting edge 149 may surround the outer perimeter of open distal end 146 so as to facilitate cutting of tissue passing through open distal end 146 and into inner shaft 140. Inner shaft 140 is configured to continuously rotate and translate within and relative to outer shaft 120 to thereby rotate and translate open distal end 146 relative to window 128. More specifically, inner shaft 140 is configured to continuously rotate and translate from a first position, wherein open distal end 146 is disposed at or proximally of a proximal end of window 128, to a second position, wherein open distal end 146 is disposed at or distally of a distal end of window 128, and back to the first position. The rotation of inner shaft 140 and, thus, cutting edge 149 thereof, facilitates the cutting of tissue as inner shaft 140 is translated between the first and second positions. Suction is applied through inner shaft 140 to facilitate removal of the cut tissue, fluids, and debris through inner shaft 140.

Hub assembly 160 includes a hub housing 162 fixedly disposed about proximal end portion 122 of outer shaft 120 with outer shaft 120 extending distally therefrom. Hub housing 162 is configured to releasably engage handpiece assembly 200. Inner shaft 140 extends through outer shaft 120 and extends proximally through hub housing 162 into a proximal extension 164 of assembly 160 wherein drive assembly 180 is operably coupled to proximal end portion 142 of inner shaft 140. Proximal extension 164 also retains RFID chip 190 therein.

Drive assembly 180 is configured to operably couple drive rotor 260 of handpiece assembly 200 (see FIG. 4) with inner shaft 140 such that rotation of drive rotor 260 (FIG. 4) drives rotation and reciprocation of inner shaft 140 within and relative to outer shaft 120. Drive assembly 180, more specifically, is configured to convert a continuous rotational input provided by drive rotor 260 (FIG. 4) into simultaneous and continuous reciprocation and rotational driving of inner shaft 140 from the first position to the second position and back to the first position.

Figure 3:
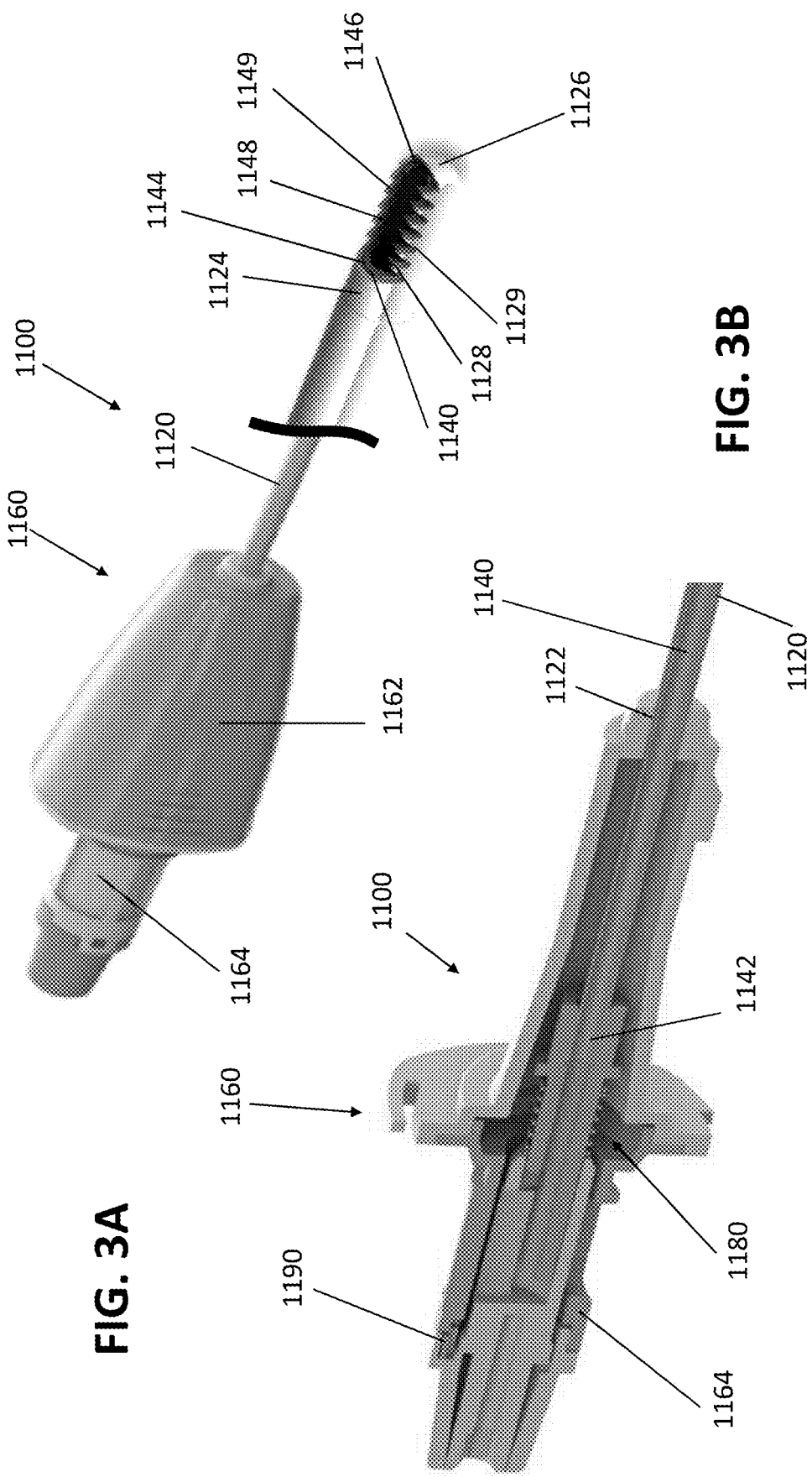
FIG. 3A is a perspective view of another end effector assembly configured for releasable engagement with the handpiece assembly of FIG. 1.
FIG. 3B is a longitudinal, cross-sectional view of a portion of the end effector assembly of FIG. 3A with parts removed.

Turning to FIGS. 3A-3B, another end effector assembly configured for releasable engagement and use with handpiece assembly 200 (FIG. 1) is shown generally identified as end effector assembly 1100. End effector assembly 1100 is similar to end effector assembly 100 (FIGS. 1 and 2) except as explicitly contradicted below and includes an outer shaft 1120, an inner shaft 1140, a hub assembly 1160, a drive assembly 1180, and an RFID chip 1190. Outer shaft 1120 includes a proximal end portion 1122 and a distal end portion 1124 defining an at least partially closed distal end 1126 and a transverse window 1128 disposed adjacent the at least partially closed distal end 1126. Window 1128 provides access to the interior of outer shaft 1120 transversely through a sidewall thereof and may be surrounded by a cutting edge 1129 about the outer perimeter of window 1128 so as to facilitate cutting of tissue passing through window 1128 and into outer shaft 1120. Cutting edge 1129 may define a serrated configuration including a plurality of cutting teeth or may define any other suitable configuration.

Inner shaft 1140 is rotatably disposed within outer shaft 1120 and includes a proximal end portion 1142 and a distal end portion 1144 defining an at least partially closed distal end 1146 and a transverse window 1148 disposed adjacent the at least partially closed distal end 1146. Window 1148 provides access to the interior of inner shaft 1140 and may be surrounded by a cutting edge 1149 about the outer perimeter of window 1148 so as to facilitate cutting of tissue passing through window 1148 and into inner shaft 1140. Cutting edge 1149 may define a serrated configuration including a plurality of cutting teeth or may define any other suitable configuration.

Continuing with reference to FIGS. 3A and 3B, inner shaft 1140 is configured for rotation and/or oscillation within and relative to outer shaft 1120 to thereby rotate or oscillate window 1148 relative to window 1128. More specifically, inner shaft 1140 is configured to rotate or oscillate between a first position and a second position. In the first position, window 1128 and window 1148 are aligned with one another to enable drawing of tissue through window 1128 and window 1148, under suction, thereby facilitating the cutting of tissue extending into inner shaft 1140 as inner shaft 1140 is rotated or oscillated relative to outer shaft 1120. Applied suction also facilitates removal of tissue, fluids, and debris through inner shaft 1140.

In the second position, inner shaft 1140 is rotated relative to outer shaft 1120 such that window 1128 and window 1148 are fully misaligned, e.g., do not overlap, from one another to close the passageway into inner shaft 1140. Moving to the second position, and fully misaligning window 1128 and window 1148 ensures that tissue that had been pulled through windows 1128, 1148 is fully separated to enable removal from the surgical site through tissue resecting instrument 10 (FIG. 1).

Inner shaft 1140 may be driven to rotate continuously in a single direction from the first position to the second positon and back to the first position. Alternatively, inner shaft 1140 may be configured to repeatedly oscillate, rotating from the first position to the second position in a first direction and then rotating in a second, opposite direction from the second position back to the first position. End effector assembly 1100 may be driven in either the rotational or oscillatory fashion, depending upon the input received from handpiece 200 (FIG. 1).

Hub assembly 1160 includes a hub housing 1162 fixedly disposed about proximal end portion 1122 of outer shaft 1120 with outer shaft 1120 extending distally therefrom. Hub housing 1162 is configured to releasably engage handpiece assembly 200 (FIG. 1). Hub assembly 1160 further includes a proximal extension 1164 retaining RFID chip 1190.

Drive assembly 1180 is configured to operably couple drive rotor 260 of handpiece assembly 200 (see FIG. 4) with inner shaft 1140 such that rotation of drive rotor 260 (FIG. 4) drives rotation and/or oscillation of inner shaft 1140 within and relative to outer shaft 1120. Other suitable end effectors are also contemplated for use with handpiece assembly 200 (FIG. 1) as part of tissue resecting instrument 10 (FIG. 1).

Figure 4:
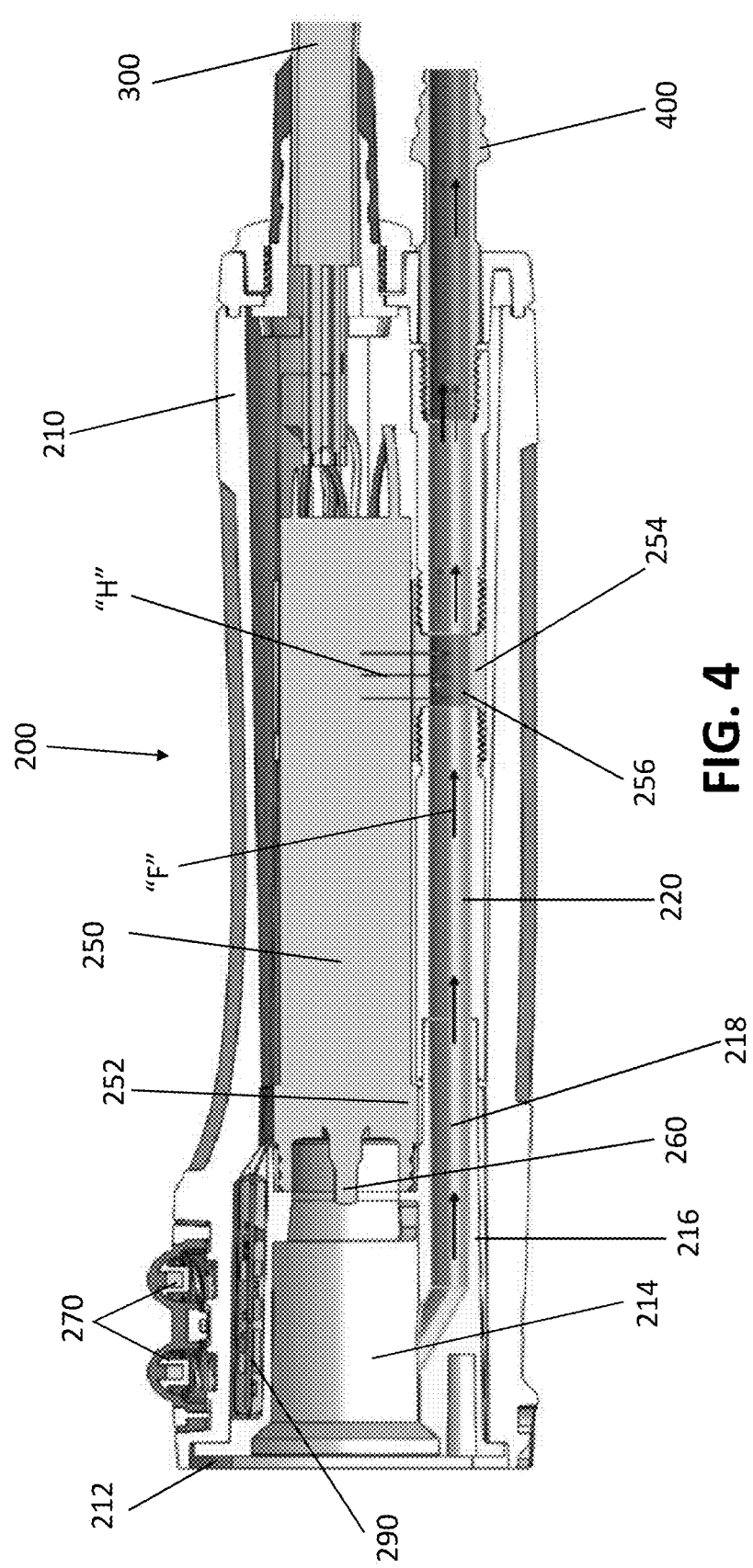
FIG. 4 is a longitudinal, cross-sectional view of the handpiece assembly of FIG. 1.

Referring to FIGS. 1 and 4, handpiece assembly 200 generally includes handle housing 210, an outflow path 220 defined through handle housing 210 and communicating with outflow port 400, a motor 250 disposed within handle housing 210, and a drive rotor 260 disposed within handle housing 210 and operably coupled to motor 250. Handpiece assembly 200 may further include one or more controls 270, e.g., buttons, disposed on handle housing 210 to activate tissue resecting instrument 10, toggle between various modes, and/or to vary the speed of motor 250. Further, outflow tubing (not shown) is configured to connect to outflow port 400 to thereby connect outflow port 400 to a fluid management system (not shown). The fluid management system includes a vacuum source to establish suction through outflow path 220 and inner shaft 140 of end effector assembly 100 (or inner shaft 1140 of end effector assembly 1100 (FIGS. 3A-3B)) of tissue resecting instrument 10 and the outflow tubing to facilitate removal of fluid, tissue, and debris from the surgical site. A collection reservoir, e.g., a collection canister, may be provided for collecting the removed fluid, tissue, and debris. As an alternative or in addition to a vacuum source establishing suction through tissue resecting instrument 10, vacuum may be created therethrough via a pressure differential between the surgical site and the outflow path.

Handle housing 210 defines an open distal end portion 212 that supports a core body 214 of handle housing 210. Open distal end portion 212 and core body 214 of handle housing 210 provide access to drive rotor 260 within handle housing 210 such that, upon engagement of end effector assembly 100, 1100 (FIGS. 3A-3B) with handpiece assembly 200, a portion of end effector assembly 100, 1100 (FIGS. 3A-3B) extends through open distal end portion 212 and core body 214 to operably couple with drive rotor 260 and fluidly couple end effector assembly 100, 1100 (FIGS. 3A-3B) with outflow path 220 via core body 214. Core body 214 is engaged with motor housing 252 of motor 250, as detailed below.

Cable 300 extends proximally from handle housing 210 and is configured to connect to the control unit (not shown) to provide power and control functionality to tissue resecting instrument 10. Cable 300, more specifically, houses one or more wires (not shown) that extend into handle housing 210 and electrically couple controls 270 and motor 250 with the control unit to power motor 250 and control operation of tissue resecting instrument 10 in accordance with controls 270, the control unit, and/or other remote control devices, e.g., a footswitch (not shown). Cable 300 further includes one or more wires that connect to an RFID transceiver 290 disposed within handle housing 210 towards the distal end thereof.

Drive rotor 260 is operably coupled with and extends distally from motor 250 such that, upon activation of motor 250, motor 250 drives rotation of drive rotor 260. Drive rotor 260 is configured for engagement with drive assembly 180, 1180 (FIG. 3B) of end effector assembly 100, 1100 (FIG. 3B) in fixed rotational orientation relative thereto upon engagement of end effector assembly 100, 1100 (FIG. 3B) with handpiece assembly 200 such that activation of motor 250 drives rotation of drive rotor 260 to, in turn, drive inner shaft 140, 1140 (FIG. 3B) of end effector assembly 100, 1100 (FIG. 3B) through a prescribed range of motion for that inner shaft 140, 1140 (FIG. 3B), e.g., rotation, oscillation, reciprocation, combinations thereof, etc.

Figure 5:
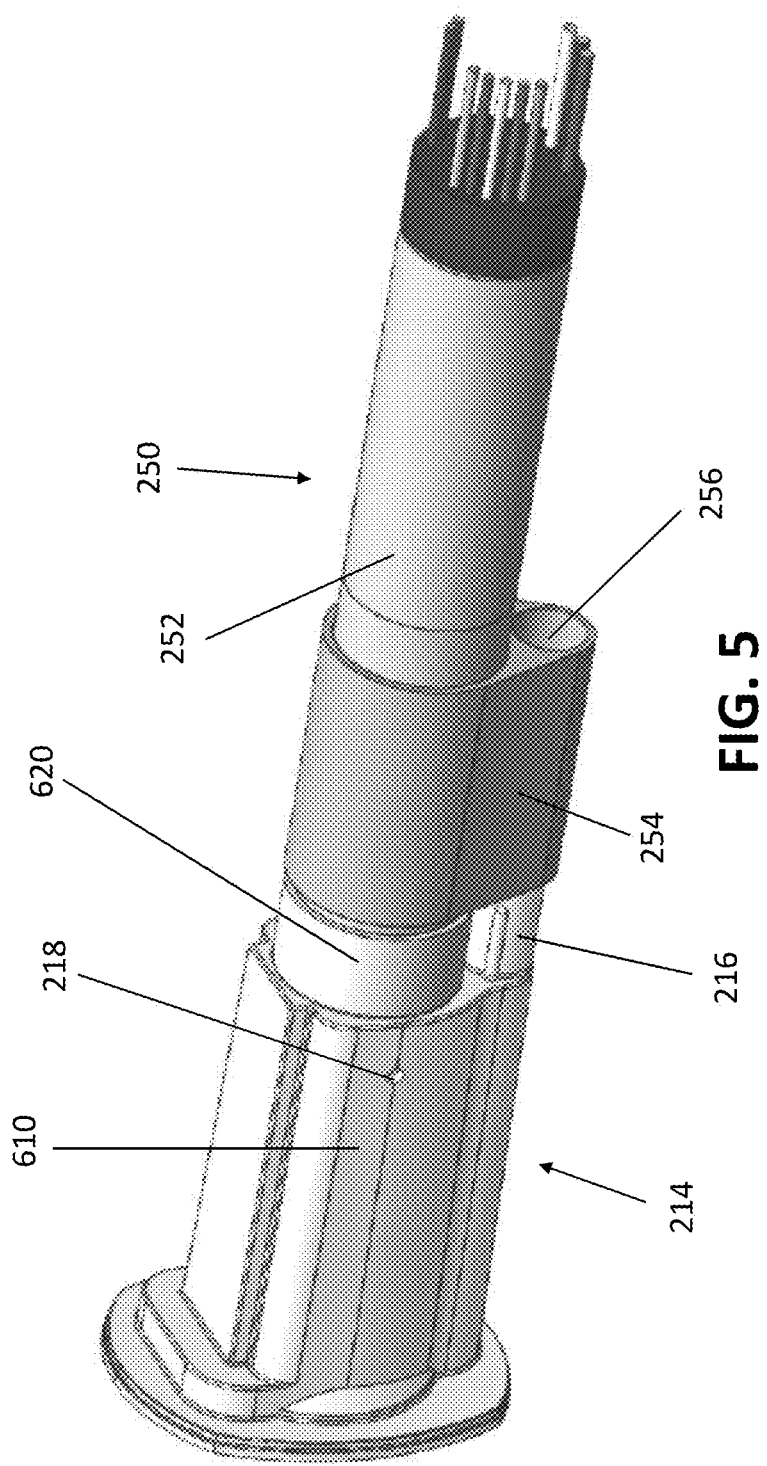
FIG. 5 is a perspective view illustrating engagement between two components, made from different materials, of the handpiece assembly of FIG. 1: the core body and the motor housing of the motor.

With continued reference to FIG. 4 and with additional reference to FIGS. 5-7, motor 250 includes a motor housing 252 that is formed from a metal, e.g., stainless steel. Motor housing 252 includes an extension 254 defining a lumen 256 that forms a portion of outflow path 220. With motor housing 252 (including extension 254 of motor housing 252) formed from a metal, having a relatively high thermal conductivity, motor housing 252 facilitates the conduction of heat generated by motor 250 to outflow fluid flowing through lumen 256 of outflow path 220, thus helping to cool motor 250 during use. The path of heat conduction is represented in FIG. 4 by arrows "H" while the path of fluid flowing through outflow path 220 is represented in FIG. 4 by arrows "F." In aspects, the location of extension 254 and/or positioning of extension 254 along outflow path 220 may be varied, e.g., more distally or proximally positioned (see FIGS. 5, 7, and 8).

Core body 214 of handle housing 210 is positioned to receive the proximal extension 164, 1164 (FIGS. 2 and 3B) of an end effector assembly 100, 1100 (FIGS. 2 and 3B) when the end effector assembly 100, 1100 (FIGS. 2 and 3B) is releasably engaged with handpiece assembly 200 to operably couple the end effector assembly 100, 1100 (FIGS. 2 and 3B) with handpiece assembly 200. Core body 214 is disposed between RFID transceiver 290 of handpiece assembly 200 and the RFID chip 190, 1190 (FIGS. 2 and 3B) of the proximal extension 164, 1164 (FIGS. 2 and 3B) of the end effector assembly 100, 1100 (FIGS. 2 and 3B) received within handle housing 210. Core body 214 is formed from a plastic, which enables wireless RF communication between RFID transceiver 290 and the RFID chip 190, 1190 (FIGS. 2 and 3B) of the end effector assembly 100, 1100 (FIGS. 2 and 3B). Core body 214 also includes an extension 216 defining a lumen 218 that forms a portion of outflow path 220. In aspects, extension 216 and extension 254 directly engage one another to establish adjacent and/or overlapping portions of outflow path 220 (see FIGS. 5-7).

Referring to FIGS. 6-9, core body 214, made from a plastic, and motor housing 252, made from a metal, are engaged to one another, as noted above. Core body 214 and motor housing 252, as detailed below, are configured for durable engagement of these components of different materials via bonding, e.g., using an epoxy or other suitable bonding agent.

Core body 214 includes an outer cylinder 610 configured to receive an inner cylinder 620 of motor housing 252, although this arrangement may be reversed. Outer cylinder 610 includes an open proximal end 612 and a radially inwardly extending distal rim 614 configured, in aspects, to limit insertion of inner cylinder 620 into outer cylinder 610. A plurality of ribs 616 are defined on the interior annular surface of outer cylinder 610. Ribs 616 extend longitudinally along the interior surface of outer cylinder 610 and are equally spaced about the inner circumference of outer cylinder 610, although other orientations and/or arrangements of ribs 616 are also contemplated. Core body 214 further includes one or more apertures 618 defined transversely through outer cylinder 610 and, more specifically, to provide access, from the exterior of outer cylinder 610, to the interior volume defined by outer cylinder 610. Although two diametrically opposed apertures 618 are shown (see FIG. 6), other suitable numbers and/or configurations of aperture 618 are also contemplated.

Motor housing 252 includes inner cylinder 620 which, as noted above, is configured for receipt within outer cylinder 610 of core body 214, although this arrangement may be reversed. Drive rotor 260 extend at least partially through inner cylinder 620 to enable operable engagement of the drive assembly 180, 1180 (FIGS. 2 and 3B, respectively) of the end effector assembly 100, 1100 (FIGS. 2 and 3B, respectively) engaged with handpiece assembly 200 (FIG. 4) with drive rotor 260. Inner cylinder 620 includes an open distal end 622 and a radially outwardly extending proximal rim 624 configured, in addition or as an alternative to distal rim 614 of core body 214, to limit insertion of inner cylinder 620 into outer cylinder 610. A plurality of grooves 626 are defined within the exterior annular surface of inner cylinder 620. Grooves 626 extend circumferentially about the exterior annular surface of inner cylinder 620 and are equally longitudinally spaced along the exterior surface of inner cylinder 620, although other orientations and/or arrangements of grooves 626 are also contemplated, e.g., wherein inner cylinder 620 includes longitudinally-extending grooves and outer cylinder 610 includes circumferentially-extending ribs, wherein inner cylinder 620 includes ribs and outer cylinder 610 includes grooves, and/or other configurations where the ribs and/or grooves of outer and inner cylinders 610, 620 intersect or otherwise extend in different directions.

Continuing with reference to FIGS. 6-9, in order to engage core body 214 and motor housing 252 with one another, inner cylinder 620 is inserted into outer cylinder 610 such that open proximal end 612 of outer cylinder 610 abuts proximal rim 624 of inner cylinder 620 and/or such that open distal end 622 of inner cylinder 620 abuts distal rim 614 of outer cylinder 610. Ribs 616 of outer cylinder 610 and/or other features of outer cylinder 610 and/or inner cylinder 620 may facilitate alignment and/or mechanical engagement of core body 214 and motor housing 252 with one another. More specifically, ribs 616, in aspects, may be configured as crush ribs to facilitate press-fit engagement and alignment of inner cylinder 620 within outer cylinder 620.

With motor housing 252 inserted into core body 214 as detailed above, an annular volume 630 is defined between inner cylinder 620 and outer cylinder 610. However, due to ribs 616 of outer cylinder 610 and grooves 626 of inner cylinder 620, annular volume 630 is not uniformly cylindrical. Rather, annular volume 630 includes a plurality of longitudinal channels 632, e.g., defined between ribs 616 of outer cylinder 610, and a plurality of circumferential or annular channels 634, e.g., defined within grooves 626 of inner cylinder 620.

In order to bond motor housing 252, formed of a metal, and core body 214, formed of a plastic, with one another, a bonding agent, e.g., an epoxy such as a two-part epoxy, may be introduced into the annular volume 630 from the exterior of core body 214 via the one or more apertures 618. As the bonding agent is introduced, longitudinal channels 632 facilitate the flow of the bonding agent longitudinally along the entire length of annular volume 630 (within each channel 632) while annular channels 634 facilitate the flow of the bonding agent annularly about the entire circumference of annular volume 630 (within each annular channel 634). Thus, a complete longitudinal and circumferential, and substantially uniform, distribution of bonding agent within annular volume 630 is achieved, thereby improving chemical bonding strength and durability. Further, the mechanical features, e.g., ribs 616 configured as crush ribs or other suitable features facilitating mechanical engagement (such as press-fit engagement), provide improved mechanical strength and durability to the engagement between motor housing 252 and core body 214.

The above-detailed engagement between core body 214 and motor housing 252 is capable of withstanding many temperature cycles of handpiece assembly 200 (FIGS. 1 and 4), e.g., as a result of use, cleaning, sterilization, etc., without degradation of the engagement. Thus, reliability of handpiece assembly 200 (FIGS. 1 and 4) is improved. Further, the above-detailed configuration of the engagement between core body 214 and motor housing 252 helps ensure that any failure would be mechanically attributed to the components themselves, rather than the chemical bond. As such mechanical failures are more readily able to be predicted, calculated, and quantified, a more reliable handpiece assembly 200 (FIGS. 1 and 4) throughout a useful life of the handpiece assembly 200 (FIGS. 1 and 4) is achieved.

Although detailed above with respect to inner and outer cylinders 620, 610, respectively, other suitable geometrical bodies are also contemplated such as, for example, inner and outer polygons (of similar or different order), ovals, combinations of different geometrical bodies, etc. may be utilized in accordance with the aspects and features of the present disclosure. It is thus understood that the terms annular, circumferential, and radial, as utilized herein, refer to the transverse dimensions or directions of such non-cylindrical geometrical bodies (as contrasted with the longitudinal dimensions or directions of such non-cylindrical geometrical bodies). Likewise, as noted above, the aspects and features of the present disclosure are not limited to engagement between metal and plastic components of surgical instrument handpiece assemblies but may apply to other components of different materials and/or components of other instruments or devices.

While several aspects and features of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as examples of particular aspects. Those skilled in the art will envision other modifications within the scope and spirit of the claims appended hereto.

Although the foregoing disclosure has been described in some detail by way of illustration and example, for purposes of clarity or understanding, it will be obvious that certain changes and modifications may be practiced within the scope of the appended claims.

What is claimed is:

1. An assembly of a surgical instrument, comprising:
    an outer component of a first material, the outer component having an interior surface;
    an inner component of a second material different from the first material, the inner component having an exterior surface, the inner component inserted at least partially into the outer component to define a volume between the interior surface of the outer component and the exterior surface of the inner component, wherein the volume includes a plurality of longitudinal channels defined within one of the outer component or the inner component and a plurality of annular channels defined within another of the outer component or the inner component, the plurality of longitudinal channels extending longitudinally along at least a portion of a length of the volume, the plurality of annular channels extending about at least a portion of a circumference of the volume in perpendicular orientation relative to the plurality of longitudinal channels; and
    a bonding agent at least partially filling each longitudinal channel of the plurality of longitudinal channels and each annular channel of the plurality of annular channels to bond the first component with the second component.

2. The assembly according to claim 1, wherein the outer component includes an outer cylinder defining the interior surface and wherein the inner component includes an inner cylinder defining the exterior surface.

3. The assembly according to claim 1, wherein one of the first material or the second material is a plastic and another of the first material or the second material is a metal.

4. The assembly according to claim 1, wherein the bonding agent is a two-part epoxy.

5. The assembly according to claim 1, wherein the outer component further includes at least one aperture in communication with the volume and configured to permit introduction of the bonding agent into the volume.

6. The assembly according to claim 1, wherein the inner component is inserted at least partially into the outer component in a press-fit engagement.

7. The assembly according to claim 1, wherein one of the outer component or the inner component includes a plurality of ribs, and wherein the plurality of ribs at least partially defines the plurality of longitudinal channels.

8. The assembly according to claim 1, wherein one of the outer component or the inner component defines a plurality of grooves, and wherein the plurality of grooves at least partially defines the plurality of annular channels.

9. The assembly according to claim 1, wherein the plurality of longitudinal channels extends longitudinally along an entirety of the length of the volume.

10. The assembly according to claim 1, wherein the plurality of annular channels extends about an entirety of the circumference of the volume.

11. An assembly of a motor-driven surgical handpiece assembly, comprising:
    a core body made of a plastic, the core body including an interior surface;
    a motor housing made of a metal, the motor housing having an exterior surface, the motor housing inserted at least partially into the core body to define a volume between the interior surface of the core body and the exterior surface of the motor housing, wherein the volume includes a plurality of spaced-apart longitudinal channels and a plurality of spaced-apart annular channels; and
    a bonding agent at least partially filling each longitudinal channel of the plurality of spaced-apart longitudinal channels and each annular channel of the plurality of spaced-apart annular channels to bond the core body with the motor housing.

12. The assembly according to claim 11, wherein the core body includes an outer cylinder defining the interior surface and wherein the motor housing includes an inner cylinder defining the exterior surface.

13. The assembly according to claim 11, wherein the bonding agent is a two-part epoxy.

14. The assembly according to claim 11, wherein the core body includes at least one aperture in communication with the volume and configured to permit introduction of the bonding agent into the volume.

15. The assembly according to claim 11, wherein the motor housing is inserted at least partially into the core body in a press-fit engagement.

16. The assembly according to claim 11, wherein the core body includes a plurality of ribs disposed on the interior surface, and wherein the plurality of ribs at least partially defines the plurality of longitudinal channels.

17. The assembly according to claim 11, wherein the motor housing includes a plurality of grooves defined within the exterior surface, and wherein the plurality of grooves at least partially defines the plurality of annular channels.

18. A method of manufacturing an assembly of a surgical instrument, the method comprising:
    inserting a second component into a first component such that a volume is defined between an interior surface of the first component and an exterior surface of the second component, the volume includes a plurality of spaced-apart longitudinal channels defined within one of the first component or the second component and a plurality of spaced-apart annular channels defined within another of the first component or the second component and extending in perpendicular orientation relative to the plurality of spaced-apart longitudinal channels; and
    introducing a bonding agent into the volume to at least partially fill each longitudinal channel of the plurality of spaced-apart longitudinal channels and each annular channel of the plurality of spaced-apart annular channels to bond the first component with the second component.

19. The method according to claim 18, wherein introducing the bonding agent includes introducing the bonding agent through at least one aperture defined within the first component.

20. The method according to claim 18, wherein inserting the second component into the first component includes press-fit engaging the second component with the first component.

* * * * *